R. C. BONE.
SUBSTITUTE FOR TURPENTINE AND PROCESS OF MAKING SAME.
APPLICATION FILED MAR. 14, 1918.
1,343,387. Patented June 15, 1920.
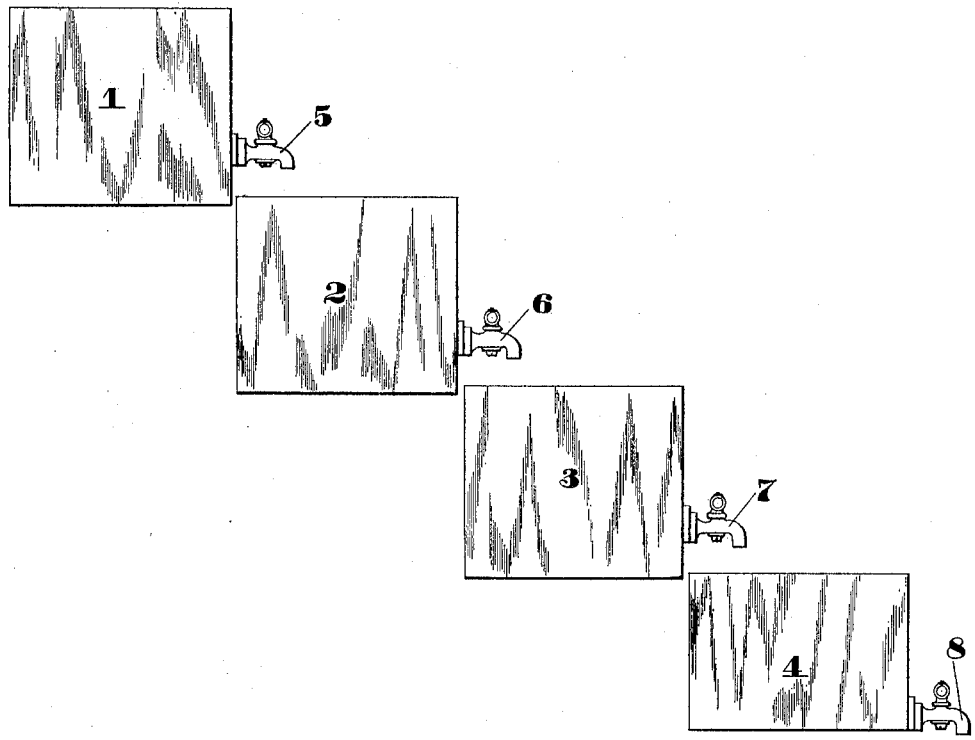
INVENTOR
R. C. Bone
BY
Duell, Warfield & Duell
ATTORNEY

UNITED STATES PATENT OFFICE.

ROBERTO C. BONE, OF MANAGUA, NICARAGUA, ASSIGNOR OF ONE-HALF TO ESTEVA-RUIZ & CO., OF NEW YORK, N. Y., A PARTNERSHIP COMPOSED OF FRANK M. WHEATON AND M. A. ESTEVA.

SUBSTITUTE FOR TURPENTINE AND PROCESS OF MAKING SAME.

1,343,387.   Specification of Letters Patent.   Patented June 15, 1920.

Application filed March 14, 1918. Serial No. 222,293.

*To all whom it may concern:*

Be it known that I, ROBERTO C. BONE, a citizen of Nicaragua, residing at Managua, in the State of Nicaragua, have invented certain new and useful Improvements in Substitutes for Turpentine and Processes of Making Same, of which the following is a full, clear, and exact description, such as will enable others skilled in the art to which it appertains to make and use the same.

This invention relates to substances suitable for use as substitutes for turpentine and to processes for making such substances.

One of the objects of this invention is the provision of a practical process for the production of a substance which may be used as a substitute for turpentine and whereby said substitute may be produced quickly and at a minimum expense.

Another object of this invention is the provision of a substance which may be used as a substitute for turpentine.

Another object is the provision of a substitute for turpentine which is in acceptable commercial form, and is similar to turpentine in physical appearance and smell.

Other objects will be in part obvious and in part pointed out hereinafter.

The invention accordingly consists in the several steps and the relation and order of one or more of such steps with relation to each of the others thereof which will be exemplified in the hereinafter disclosed process, and the scope of the application of which will be indicated in the claims that follow.

The drawing is a view of an apparatus which may be used in carrying out the process leading to the production of the compound.

In the disclosed embodiment of the invention the process involves the use of a relatively large amount of hydrocarbon, such as kerosene oil. This hydrocarbon is treated with substances and in such a manner that a relatively large bulk of a product results which, when treated with a relatively small bulk of turpentine eventuates in a relatively large bulk of the substitute referred to in its most acceptable commercial form.

Substances have been produced before capable of use as substitutes for turpentine. These for the greater part have been produced by the removal from kerosene oil of the grease-like substances present therein by distillation involving the direct application of heat to the kerosene oil. This method has been found unsatisfactory and expensive and usually results in the loss of an appreciable quantity of the oil through evaporation. Heat due to chemical reaction suffices in the present process.

Applicant has found that by introducing into a mass of kerosene a quantity of calcium carbid and water, thus forming acetylene and allowing the mixture to settle after the chemical reaction between the water and the carbid has been completed, the grease-like content present in the kerosene oil will settle at the bottom of the mixture with the solid residue remaining therein, and that the supernatant liquid is capable of use as a substitute for turpentine for all purposes, including its use for paints, varnishes, and for medicinal applications.

This liquid, however, has the odor of kerosene oil, and to remove this odor, and also to make the substance lighter, and to give it quicker drying qualities, applicant, after withdrawing the supernatant liquid from the above mixture, adds thereto a quantity of chlorid of lime and hydrochloric acid. Matter in solid form will be found to permeate the mixture, and this applicant removes from the liquid by adding thereto a quantity of calcium oxid, allowing the liquid to come to rest and withdrawing the supernatant liquid, which will be found to be free of the objectionable odor. In order to produce the best results, however, applicant, after the addition of the chlorid of lime and hydrochloric acid, allows the mixture to come to rest, then withdraws the supernatant liquid, which contains suspended therein solid particles and adds to this mixture the calcium oxid. It will be found that the resultant liquid is entirely free from objectionable odor, will evaporate easily, and will dry quickly. The characteristic odor of turpentine may be given to the substance by the addition of a small quantity of turpentine or terpineol, a lesser quantity of terpineol than turpentine being required. It is also found that if a quantity of gasolene is added to the mixture immediately after the introduction of the chlorid of lime and hydrochloric acid, the resultant substance will be improved in its drying qualities and will be lighter.

In carrying out the present embodiment of the invention several tanks or containers may be employed as illustrated in the drawing. These tanks may be arranged one above another for convenient discharge from the highest to the lowest tank. In the upper tank is placed the hydrocarbon; the kerosene oil. In making a relatively large bulk of the product 1,000 gallons of kerosene oil may be placed in the upper tank 1. There the grease-like impurities may be caused to sink to the bottom of the tank as by the introduction therein of a proper proportion of calcium carbid and water, the proportions for the amount of kerosene being approximately 100 lbs. of calcium carbid and 20 gallons of water, and the mixture being allowed to rest for a sufficient length of time to allow the mixture to settle; approximately six hours. The supernatant liquid, as above pointed out, may be used as a substitute for turpentine. The acetylene gas generated in this tank by the combination of the calcium carbid and water may be trapped and used in the lighting of the plant, or otherwise as desired.

To improve the substance, as above described, the supernatant liquid from the tank 1 is then discharged into tank 2, and to this is added a suitable quantity of chlorid of lime and hydrochloric acid, 50 lbs. of the former and 30 lbs. of the latter being proper for the amount of liquid coming from the first tank, as stated. 10 per cent. of gasolene may also be added at this point, if desired. In the tank 2 the mixture is allowed to remain until it has settled sufficiently; approximately twelve hours. Then the supernatant liquid is discharged into the third tank 3, and a suitable quantity of calcium oxid is added thereto, 50 lbs. being proper in the present instance. In this third tank the mixture is allowed to remain until it has sufficiently settled; approximately six hours, and the supernatant liquid is then discharged into a fourth tank 4. The liquid in this fourth tank will be substantially odorless and by the addition of a relatively small proportion of turpentine or turpineol, (approximately 10 gallons of turpentine or 5 gallons of turpineol will suffice for the quantity stated), will convert it into a substance which not only is immediately available for use as a substitute for turpentine, but also is similar to turpentine in physical appearance and smell. Tanks 1, 2, 3, and 4 are supplied with spigots 5, 6, 7, and 8 respectively, to permit of the ready removal of the supernatant liquid from each tank. The spigots in the tanks 1, 2, and 3 are somewhat above the bottom of the tanks a sufficient distance so as to permit of the withdrawal of the supernatant liquid only from the tanks. The removal of any sediment may be accomplished in any manner desirable.

The period of rest mentioned in connection with the special properties of the different substances as above referred to have been found to be most efficient. It is to be understood, however, that good results follow from even longer or shorter periods, and that only one-half the time specified may be necessary in some instances, as for instance, where the bulk of material is initially small. Sufficient time should be given for the reaction to take place and for the sediment to settle to permit of the removal of the liquid desired to be introduced into the next tank.

Thus by the above described process is produced a substance having many of the qualities of natural turpentine. Its strength compares favorably with that of the natural product and it has ameliorating qualities due to its oil base which renders it less harsh in medicinal applications than is the natural product, and thus are accomplished, among others, the objects hereinbefore referred to.

Having described my invention, what I claim as new and desire to secure by Letters Patent is—

1. A process for producing a substitute for turpentine comprising treating kerosene with acetylene.

2. A process for producing a substitute for turpentine comprising treating kerosene with acetylene, and then treating the resultant liquid with chlorid of lime and hydrochloric acid.

3. A process for producing a substitute for turpentine comprising treating kerosene with acetylene, then treating the resultant liquid with chlorid of lime and hydrochloric acid, then adding calcium oxid to the mixture, and thereafter separating the liquid content from the mixture.

4. A process for producing a substitute for turpentine comprising treating kerosene with calcium carbid and water in the presence of each other.

5. A process for producing a substitute for turpentine comprising treating kerosene with calcium carbid and water in the presence of each other, allowing the mixture to settle, separating the liquid from the solid content of the mixture, and then adding chlorid of lime and hydrochloric acid to the separated liquid.

6. A process for producing a substitute for turpentine comprising treating kerosene with calcium carbid and water in the presence of each other, allowing the mixture to settle, separating the liquid from the solid content of the mixture, then adding chlorid of lime and hydrochloric acid to the separated liquid, allowing the resultant mixture to stand, then separating the supernatant liquid and to the separated liquid adding calcium oxid.

7. A process for producing a substitute for turpentine which includes treating kerosene oil with calcium carbid and water, allowing the mixture to come to rest and removing the supernatant liquid therefrom.

In testimony whereof I affix my signature, in the presence of two witnesses.

ROBERTO C. BONE.

Witnesses:
 H. M. SEAMANS,
 HENRY VAN ARSDALE, Jr.